United States Patent [19]

Cox et al.

[11] Patent Number: 5,609,792
[45] Date of Patent: Mar. 11, 1997

[54] PHOSPHOR AND METHOD OF MAKING SAME

[75] Inventors: James R. Cox, Monroeton; Ronald E. Karam, Towanda, both of Pa.

[73] Assignee: Osram Sylvania Inc., Danvers, Mass.

[21] Appl. No.: 646,780

[22] Filed: May 21, 1996

Related U.S. Application Data

[63] Continuation-in-part of Ser. No. 425,536, Apr. 20, 1995, Pat. No. 5,531,926, which is a continuation-in-part of Ser. No. 189,012, Jan. 28, 1994, abandoned, which is a continuation-in-part of Ser. No. 999,637, Dec. 31, 1992, abandoned.

[51] Int. Cl.$^6$ .............................. C09K 11/59; C09K 11/61
[52] U.S. Cl. .............................. 252/301.4 F; 252/301.4 H
[58] Field of Search ...................... 252/301.4 F, 301.4 H

[56] References Cited

U.S. PATENT DOCUMENTS

| | | | |
|---|---|---|---|
| 3,149,947 | 9/1964 | Eppler et al. | 65/33 |
| 3,149,982 | 9/1964 | Eppler | 106/39 |
| 5,032,547 | 7/1991 | Giannelis et al. | 252/512 |
| 5,185,180 | 2/1993 | Kasenga et al. | 427/67 |
| 5,306,441 | 4/1994 | Reddy et al. | 252/301.4 F |
| 5,531,926 | 7/1996 | Qi et al. | 252/301.4 H |

OTHER PUBLICATIONS

W. Eitel, R. Hatch, M. Denny, J. Amer. Cer. Soc., 36, 341–348 (1953).

K. Kuroda, M. Ogawa, T. Yanagisawa, & C. Kato, Layered Inorganic–Organic Nanocomposites: Application to Photofunctional Materials and Conversion to Inorganic Micropourous Materials, Nanophase adn Nanocomposite Materials Symposium, Dec. 1–3 1992, Boston, MA, pp. 335–347.

K. Kitajima, K. Miyaka, & N. Takusagawa, Changes in Swelling Characteristics and Structure of Na–Fluorine Micas with Ga— and Al— Substitutions, J. Ceramic. Soc. Jpn. Int. Ed., 1991, 99(12), pp. 1174–1182.

K. Kitajima and N. Daimon, Synthesis of Na–Flour–Tetrasilicic Mica [NaMg$_{2.5}$(Si$_4$O$_{10}$)F$_2$] and its Swelling Characterisitcs, Nippon Kagaku Kaishi, (6), pp. 991–995 (1975).

V. Luca, X. Chen, & L. Kevan, Chem. Mater. 3, pp. 1073–1081 (1991).

H. Shell and K. Ivey, Fluoromicas, Bureau of Mines, U.S. Dept. of Interior Bulletin 647, pp. 123–144 (1969).

Bergaya et al., J. Chem. Soc., Faraday Trans. 2, 79, 505–518 (1983).

*Primary Examiner*—Melissa Bonner

[57] ABSTRACT

Inorganic intercalation phosphors were made by doping an inorganic intercalation compound having an atomic structure interspersed with vacant spaces with selected activator ions capable of luminescent emission when excited by ultraviolet light and/or cathode rays.

4 Claims, 1 Drawing Sheet

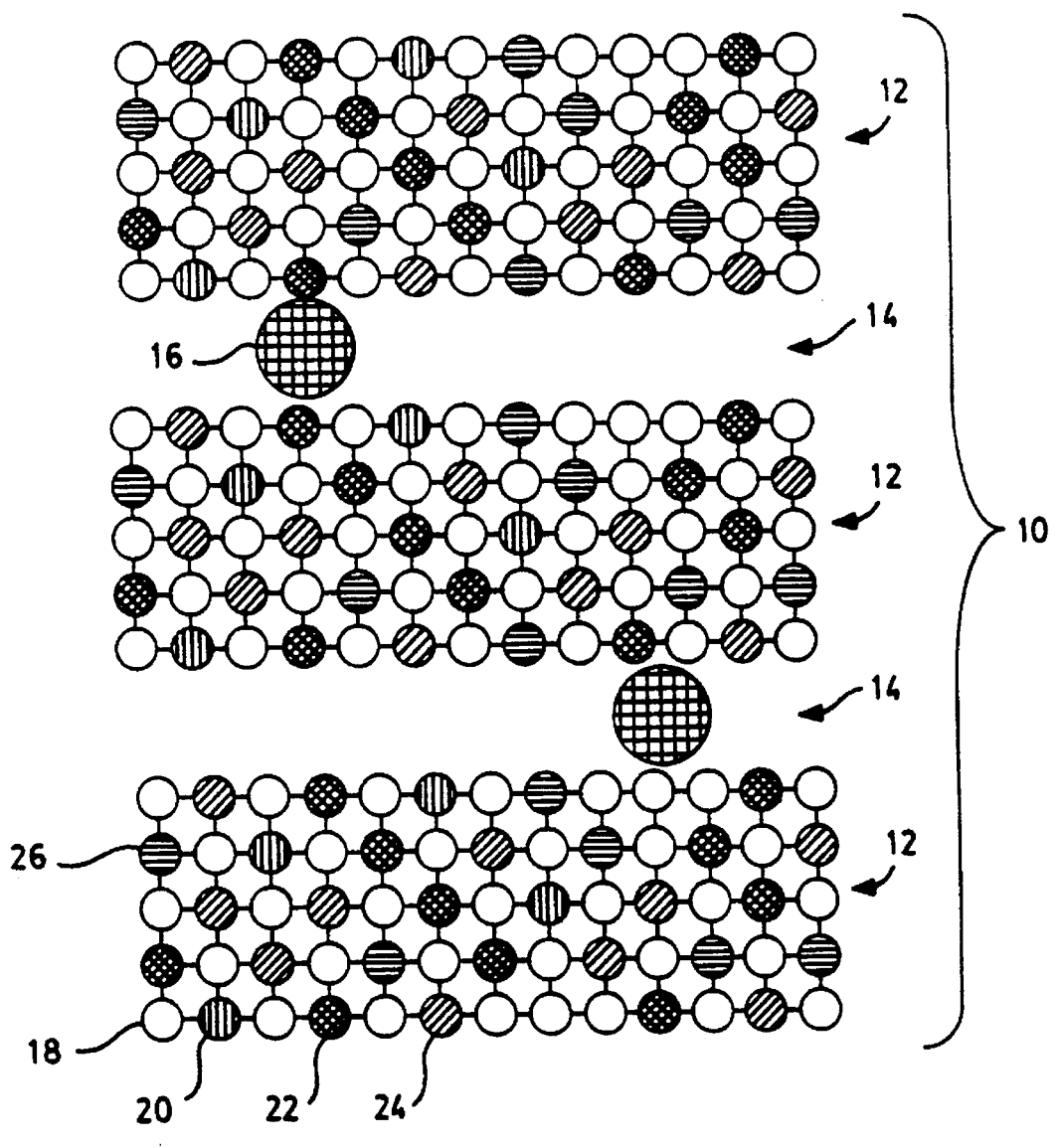

PHOSPHOR AND METHOD OF MAKING SAME

The United States Government has rights in this invention pursuant to U.S. Government Contract No. DAAL01-92-C-0241.

CROSS-REFERENCE TO RELATED APPLICATIONS

This application is a continuation-in-part of application Ser. No. 08/425,536, filed Apr. 20, 1995, now U.S. Pat. No. 5,531,926, which is a continuation-in-part of application Ser. No. 08/189,012, filed Jan. 28, 1994, now abandoned, which is a continuation-in-part of application Ser. No. 07/999,637, filed Dec. 31, 1992, now abandoned, the disclosures of which are hereby incorporated by reference.

TECHNICAL FIELD

This invention relates to phosphors and methods of making them. In particular, it relates to inorganic intercalation phosphors made by doping inorganic intercalation compounds with selected activator ions which, when excited by ultraviolet light, cathode rays or other exciting radiation, are capable of luminescent emission.

BACKGROUND ART

In present day society, there exist numerous applications for phosphors. For example, phosphors are critical components in a number of lamp types, electroluminescent devices, and cathode ray tubes for televisions and computer monitors. Generally, the performance of these devices can be directly linked to the performance of the phosphors which they incorporate. Thus, in order to promote the evolution of these technologies, it is essential that new phosphors routinely be developed which could be used in those applications.

For lighting applications, it is desirable that phosphors luminesce when stimulated by ultraviolet radiation (U/V), which is generally defined as the portion of the electromagnetic spectrum between about 4–400 nm. Such UV excitable phosphors are defined as being photoluminescent. Photoluminescent phosphors find use in a number of different lamp types including fluorescent, high pressure mercury and neon sign lamps. For fluorescent lighting applications, it is particularly important that phosphors be stimulable by the primary ultraviolet emissions from low pressure mercury discharges which occur at 185 and 254 nm.

For cathode ray tube applications, it is necessary that phosphors luminesce when excited by cathode ray radiation (CR), which consists of high energy electrons. Phosphors which are excited by cathode rays are defined as being cathodoluminescent. Although it is desirable that cathodoluminescent phosphors emit light over the entire range of the visible spectrum, phosphors that emit red, green and blue light are particularly important for use in the manufacture of luminescent screens for televisions and computer monitors.

Finally, most phosphors which are cathodoluminescent and/or photoluminescent are also electroluminescent and would likely be useable in electroluminescent devices. Thus, it would be an advantage in the art to provide novel phosphors which are capable of luminescent emission when excited by either ultraviolet radiation or cathode rays or both.

SUMMARY OF THE INVENTION

It is an object of this invention to provide inorganic intercalation phosphors capable of luminescent emission when excited by ultraviolet and/or cathode rays.

It is a further object of this invention to provide methods for producing inorganic intercalation phosphors.

In accordance with one aspect of the invention, a phosphor is provided comprising europium activated tetra silicic mica. More particularly, a phosphor is provided having a general formula $K[Mg_{2.5-x}, Eu_x]Si_4O_{10}F_2$ where x is from 0.02 to 0.10.

In accordance with another aspect of the invention, there is provided a method for making a europium activated tetra silicic mica phosphor having a general formula $K[Mg_{2.5-x}, Eu_x]Si_4O_{10}F_2$ where x is from 0.02 to 0.10, comprising: mixing stoichiometric amounts of $K_2CO_3$, $MgO$, $(NH_4)_2SiF_6$, $SiO_2$, and $EuF_3$, and firing the mixture at about 1000° C. for about 12 to about 24 hours.

BRIEF DESCRIPTION OF THE DRAWINGS

The FIGURE is a schematic diagram representing the approximate atomic structure of fluorophlogopite, an inorganic intercalation compound.

BEST MODE FOR CARRYING OUT THE INVENTION

For a better understanding of the present invention, together with other and further objects, advantages and capabilities thereof, reference is made to the following specification and appended claims.

Numerous inorganic intercalation compounds are known. They generally have an atomic structure characterized by the presence of ionically bonded atoms in substructures interspersed with vacant spaces which are sufficiently large to accommodate foreign atoms or molecules within them. Intercalation compounds are generally of three types: lamellar, or layered, compounds; channel-type compounds; and cage-type compounds.

In lamellar intercalation compounds the atomic substructures comprise layers, or lamellae, of ionically bonded inorganic atoms. The lamellae themselves are bonded together by relatively weak forces, known as Van der Waals forces. The relatively weak Van der Waals forces between the lamellae permit the entry of foreign atoms or molecules into the spaces (hereinafter referred to as "Van der Waals spaces") between the lamellae. The Van der Waals spaces in lamellar intercalation compounds are large enough to accommodate foreign atoms or molecules which may be introduced by various methods, such as, for example, ion exchange, diffusion, acid-base reactions and electrochemical reactions.

In channel-type intercalation compounds the atomic substructures comprise zones of ionically bonded inorganic atoms which are interspersed with networks of vacant channels which are sufficiently large to accommodate foreign atoms or molecules within them. In cage-type intercalation compounds the atomic substructures of ionically bonded atoms are interspersed with vacant holes, or cages, which are sufficiently large to accommodate foreign atoms or molecules within them. The vacant channels or cages are interspersed throughout the atomic structure of the intercalation compound.

The lamellae of a crystal of a lamellar inorganic intercalation compound are generally parallel to the long axis of the crystal, whereas the channels of a channel-type inorganic intercalation compound crystal, and the cages or holes of a cage-type crystal, may be more randomly oriented.

Suitable inorganic intercalation compounds include vermiculites, micas, fluoromicas, xerogels (such as, for example, vanadium pentoxide made by sol-gel processing), iron oxychloride, zirconium phosphates, and zeolites.

Vermiculite is a lamellar intercalation compound which has the idealized general formula $(Ca,Mg)_{x/2}(Mg,Fe,Al)_3$ $[(Al,Si)_4O_{10}](OH)_2$, where the first listed calcium and magnesium ions are exchangeable cations which reside in the interlamellar Van der Waals spaces, and x is any integer. Mica is another type of lamellar intercalation compound having the general idealized formula $M_x(Si_4O_{10})$ $(OH)_2$, where M is an exchangeable cation, typically aluminum or magnesium, and x is any integer. Fluoromicas, which are similar in structure to vermiculites, have the general idealized formula $(Ca,Mg)_{x/2}(Mg,Fe,Al)_3[(Al,Si)_4O_{10}]F_2$. An example of a fluoromica is fluorophlogopite, which has the general formula $KMg_3(Si_3Al)O_{10}F_2$.

The figure is a schematic representation of the lamellar atomic structure of fluorophlogopite. Fluorophlogopite 10 is comprised of atoms of oxygen 18, aluminum 20, silicon 22, magnesium 24 and fluorine 26 which are ionically bonded together into atomic substructures 12. Between the atomic substructures 12 are Van der Waals spaces 14 in which reside potassium atoms 16.

Zirconium phosphates have the general formula $Zr(MPO_4)_2 \cdot xH_2O$, where M is a monovalent exchangeable cation and x is any integer.

Zeolites are crystalline aluminosilicate intercalation compounds having an atomic structure which is interspersed with networks of channels and/or cages filled with exchangeable cations and water. Zeolites have the general formula $M_xD_y(Al_{x+2y}Si_{n-(x+2y)}\ _{O2n}) \cdot mH_2O$, where M is a monovalent or divalent exchangeable cation and x and y are any integers. The channels and/or cages within the zeolite structure are sufficiently large to accommodate foreign atoms or molecules within them, including organic polymers, which may be introduced by the previously described methods.

The inorganic intercalation compounds are doped with selected activator ions which are capable of luminescent emission under cathodoluminescent, fluorescent, x-ray or electroluminescent excitation. The following table lists several activator ions suitable for doping, along with the probable emission color from each. The precise emission colors obtained will depend on the site occupied by the particular activator ion in the lattice of the inorganic intercalation compound.

TABLE 1

| ACTIVATOR ION DOPANTS AND THEIR EMISSION COLORS | | |
|---|---|---|
| RED | GREEN | BLUE |
| $Mn^{+2}$ | $Mn^{+2}$ | $Sb^{+3}$ |
| $Mn^{+4}$ | $Eu^{+2}$ | $Ti^{+4}$ |
| $Fe^{+3}$ | $Tb^{+3}$ | $Sn^{+2}$ |
| $Eu^{+3}$ | | $Tm^{+3}$ |
| $Sm^{+3}$ | | $Eu^{+2}$ |
| $Cr^{+3}$ | | $Ce^{+3}$ |

The activator ions may be doped into the atomic lattice of the inorganic intercalation compound by several methods, including high-temperature solid-state synthesis (generally in excess of 1000° C.), hydrothermal synthesis, wet-chemical procedures and low-temperature procedures. The activator ions generally occupy lattice sites with the atomic structure of the inorganic intercalation compound. For example, when an inorganic intercalation compound, such as fluorophlogopite, is doped with manganese ions, the manganese ions replace a small fraction of the magnesium ions in the fluorophlogopite atomic structure.

Fluxing agents, such as, for example, sodium chloride or barium chloride, may be used during the doping process, although they are not generally required.

The doped inorganic intercalation compound may be excited with, for example, cathode ray or ultraviolet radiation, to determine its luminescence intensity and its emission color. Luminescence intensity of the doped inorganic intercalation compound may be optimized by varying the amounts of the desired dopant ions.

Another lamellar intercalation compound is tetra silicic mica (TSM). Like other micas, tetra silicic mica, $KMg_{2.5}Si_4O_{10}F_2$, is a solid state inorganic material having a layered-type structure composed of sheets of inorganic material which are electrostatically held together. The $K^+$ ions in the Van der Waals spaces between the layers are available for ion exchange with other ionic species. These exchangeable cations and the fact that TSM powders consist of crystallites having a well formed platelet morphology make the material an excellent candidate for intercalation procedures.

The following non-limiting examples are presented.

The luminescence of the phosphor samples was evaluated by exciting them with ultraviolet (UV) and cathode ray (CR) radiation. All brightness measurements given in the following examples are in foot-Lamberts (fL). Typical. UV excitation was performed with the 254 nm line from a mercury discharge. Cathode ray excitation was typically performed using a focused high energy electron beam at 10 kV, 10 uA or 15 kV, 8 uA.

Tetra Silicic Mica Phosphors

EXAMPLES 1–5

Red-emitting tetra silicic mica phosphors having the general formula $K[Mg_{2.5-x}, Eu_{x]Si4}O_{10}F_2$ were synthesized using a high temperature solid-state method. The general formula indicates that the europium activator, $Eu^{3+}$, is believed to be substituting for $Mg^{2+}$ ions in the TSM lattice. Reagent mixtures were made by blending appropriate quantities of potassium carbonate ($K_2CO_3$), magnesium oxide (MgO), ammonium hexafluorosilicate (($NH_4)_2SiF_6$), silicon dioxide ($SiO_2$) and europium fluoride ($EuF_3$). Samples having europium activator concentrations of $0 \leq x \leq 0.10$ were prepared. The quantities of the reagents are given in the following table.

| | Example 1 | Example 2 | Example 3 | Example 4 | Example 5 |
|---|---|---|---|---|---|
| $K_2CO_3$ (g) | 8.42 | 8.37 | 8.27 | 8.22 | 8.17 |
| MgO (g) | 12.28 | 12.11 | 11.77 | 11.60 | 11.44 |
| $(NH_4)_2SiF_6$ (g) | 7.24 | 7.19 | 7.11 | 7.06 | 7.02 |
| $SiO_2$ (g) | 26.88 | 26.71 | 26.38 | 26.22 | 26.07 |
| $EuF_3$ (g) | 0.00 | 0.506 | 1.500 | 1.988 | 2.470 |
| (moles Eu/ mole phosphor | 0.00 | 0.02 | 0.06 | 0.08 | 0.10 |
| CR Brightness (fL) | 0.308 | 0.701 | 1.557 | 2.195 | 2.021 |

The reagents were blended together for 20–30 minutes on a mechanical mixer. The mixtures were placed in alumina crucibles and fired at 1000° C. for 12–24 hours. Samples were then pulverized and sieved, if necessary, to form the final product. Each sample was analyzed using x-ray powder diffraction to confirm the formation of tetra silicic mica. Under UV excitation (254 nm), the Eu-activated samples displayed a weak luminescence. Under CR excitation, the excited phosphors exihibited a red emission with emission peaks centered near 580, 610 and 710 nm. CR Brightness data is given in the above table. The emission from the unactivated sample is believed to have been cause by a manganese impurity. Maximum brightness was observed at about 0.08 moles Eu/mole of phosphor.

While there have been shown what are at present considered to be the preferred embodiments of the invention, it will be apparent to those skilled in the art that various changes and modifications can be made herein without departing from the scope of the invention as defined by the appended claims.

We claim:

1. A phosphor comprising europium activated tetra silicic mica.

2. The phosphor of claim 1 wherein the phosphor has a general formula $K[Mg_{2.5-x}, Eu_x]Si_4O_{10}F_2$ where x is from 0.02 to 0.10.

3. The phosphor of claim 2 wherein $x=0.08$.

4. A method for making a europium activated tetra silicic mica phosphor having a general formula $K[Mg_{2.5-x}, Eu_x]Si_4O_{10}F_2$ where x is from 0.02 to 0.10, comprising: mixing stoichiometric amounts of $K_2CO_3$, MgO, $(NH_4)_2SiF_6$, $SiO_2$, and $EuF_3$, and firing the mixture at about 1000° C. for about 12 to about 24 hours.

* * * * *